United States Patent [19]

Hill et al.

[11] 4,107,628
[45] Aug. 15, 1978

[54] CW BRILLOUIN RING LASER

[75] Inventors: Kenneth O. Hill, Kanata; Brian S. Kawasaki, Carleton Place; Derwyn C. Johnson, Ottawa, all of Canada

[73] Assignee: Canadian Patents and Development Limited, Ottawa, Canada

[21] Appl. No.: 792,928

[22] Filed: May 2, 1977

[51] Int. Cl.² ............................................. H01S 3/30
[52] U.S. Cl. ........................... 331/94.5 N; 350/96.30; 356/106 LR
[58] Field of Search ..................... 331/94.5 C, 94.5 D, 331/94.5 N; 350/96 WG; 356/106 LR; 307/88.3

[56] References Cited

U.S. PATENT DOCUMENTS 3,705,992  12/1972  Ippen et al. .................... 331/94.5 N

OTHER PUBLICATIONS

Johnson et al., Tunable Raman Fibre-Optic Laser, Electronics Letters, vol. 13, No. 2, (Jan. 20, 1977), pp. 53–55.
Stone, C. W., Raman Fiber Amplifier, Appl. Phys. Lett., vol. 26, No. 4, (Feb. 15, 1975), pp. 163–165.

*Primary Examiner*—William L. Sikes
*Attorney, Agent, or Firm*—Edward Rymek

[57] ABSTRACT

A CW Brillouin ring laser utilizing a low loss optical fiber and a pair of partially reflective mirrors positioned to form a ring optical path with the fiber ends, produces a Brillouin shifted Stokes beam when a pump beam is directed into one end of the optical fiber. The Brillouin beam propagates around the ring in a direction opposite to the pump beam. The pump beam is coupled into the ring through one of the partially reflective mirrors and the laser output is the portion of the Brillouin beam passing through the other partially reflective mirror. In the Brillouin laser system, a second pump beam may be directed into the other end of the fiber to produce a second Brillouin beam propagating in a direction opposite to the first Brillouin beam, providing a laser with two distinct Brillouin beam outputs.

5 Claims, 4 Drawing Figures

CW BRILLOUIN RING LASER

BACKGROUND OF THE INVENTION

This invention is directed to a continuous wave laser and in particular to a Brillouin optical fiber ring laser.

Optical fibers are known to provide a particularly suitable medium for the study of stimulated scattering processes. The strong transverse confinement of the optical fields by the fiber and the long interaction lengths that are possible significantly reduce the pump-power levels required to observe nonlinear processes. Stimulated Brillouin scattering (SBS) has been observed in glass fibers using a xenon-laser pump at 5355 A with power levels less than 1W in 600 nsec pulses. These observations have been reported in the publication by E. P. Ippen and R. H. Stolen, Applied Physics Letters 21, 539 (1972).

SUMMARY OF THE INVENTION

It is therefore an object of this invention to provide a Brillouin ring laser having continuous wave operation.

It is a further object of this invention to provide a Brillouin ring laser having a low threshold.

It is another object of this invention to provide a Brillouin ring laser having a high continuous conversion efficiency.

These and other objects are achieved in a Brillouin ring laser including a length of low loss optical fiber having a first end and a second end, a pump laser for directing a pump beam into the first end of the optical fiber which generates a Brillouin shifted Stokes beam therein and a first and a second partially reflective mirror which are positioned to form a ring beam path with the first and second ends of the optical fiber. The Brillouin beam emanates from the first end of the fiber propagating in a direction opposite to the pump beam. It is partially reflected by the first mirror to the second mirror and partially reflected by the second mirror into the second end of the optical fiber as feedback.

Microscope objectives may be located at each end of the fiber to obtain efficient coupling of the beams into and out of the fiber. The pump laser may be located so as to direct the pump beam into the fiber directly through the first mirror, the laser output being the portion of the Brillouin beam passing through the second mirror, or the pump laser may be located so as to direct the pump beam through the second mirror on to the first mirror for reflection into the first end of the fiber, the laser output in this case being the portion of the Brillouin beam passing through the first mirror.

The Brillouin laser may further include a second pump laser for directing a pump beam into the second end of the optical fiber for generating a second Brillouin shifted Stokes beam which propagates around the ring in a direction opposite to the first Brillouin beam providing for two separate output Brillouin beams.

DESCRIPTION OF THE PREFERRED EMBODIMENTS

Figure 1:
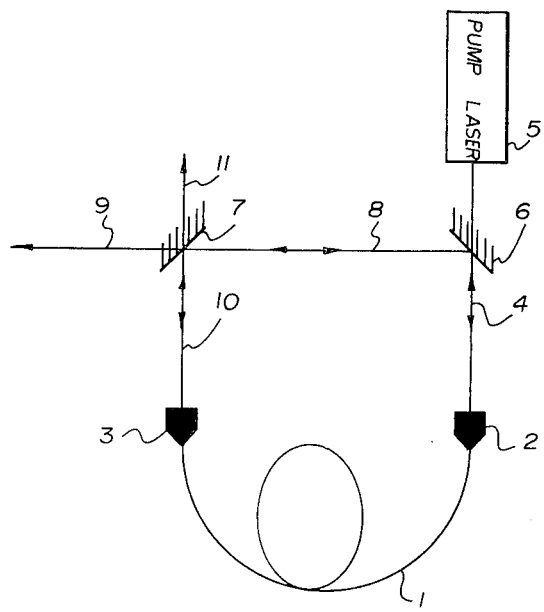
FIG. 1 illustrates a first embodiment of a Brillouin ring laser in accordance with the present invention.

An embodiment of the Brillouin ring laser in accordance with the present invention is illustrated in figure 1. The Brillouin ring laser includes a single-mode optical fiber 1 which has very low losses at the pump laser frequency. The optical fiber 1 is fitted with microscope objectives 2 and 3 at either end for coupling optical energy into and out of the fiber 1.

Optical energy is pumped along a beam path 4 into the optical fiber 1 via objective 2 by a pump laser 5. The pump laser 5 is tuned to a specific desired oscillation and may include an etalon internal to the laser cavity to select a single longitudinal mode that has a narrow linewidth. An argon-ion laser tuned to 5145 A and having an oscillation linewidth less than the spontaneous Brillouin linewidth may be used as pump laser 5. The spontaneous Brillouin linewidth depends on the light frequency and the material of the fiber.

The ring laser is completed by a pair of partially reflective mirrors 6 and 7. The input mirror 6 is located on beam path 4 and receives the Brillouin shifted beam travelling in the opposite direction to the pump laser 5 beam from the first end of the fiber 1 and directs it along path 8 to the second partially reflective mirror 7 where a portion of the Brillouin shifted beam is taken out along path 9 as the Brillouin laser output and the remainder is directed along path 10 into the second end of fiber 1 via objective 3.

In operation, the pump beam follows beam path 4 through mirror 6, into the first end of the fiber 1, out of the second end of the fiber 1, along path 10 to mirror 7 where a portion is reflected along path 8 and the remainder exists along path 11. As the pump beam propagates in the optical fiber 1, Brillouin shifted Stokes radiation is produced by stimulated acoustical phonon scattering. With the single-mode fiber 1 acting as the gain medium, energy and momentum conservation dictates that amplification can occur only for a Stokes light wave that propagates contradirectionally to the pump mode and whose frequency is down-shifted from the pump frequency by $$\Delta f = 2nV/\lambda \tag{1}$$

In this expression, $V$ is the velocity of sound in the fiber 1 core, $\lambda$ is the free-space wavelength of the pump light and $n$ is the refractive index of the fiber 1 core at the pump wavelength.

Figure 2:
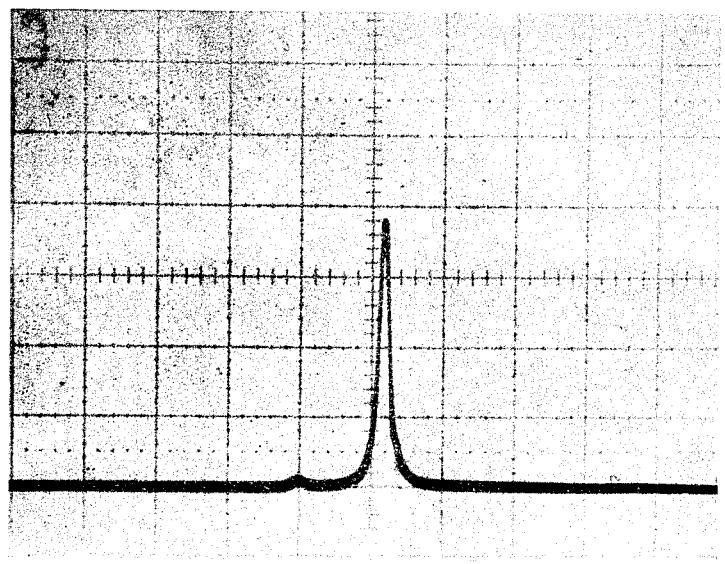
FIG. 2 illustrates a trace of the Brillouin ring laser output.

Thus the Brillouin shifted optical energy leaves the fiber 1 at its first end, propagates along path 4 to mirror 6 and is partially reflected to mirror 7. At mirror 7, a portion of the beam is reflected along path 10 and enters the fiber 1 via objective 3 as feedback. The remaining portion of the beam propagates along path 9 as the laser output. FIG. 2 illustrates a frequency trace of the Brillouin shifted output at the right and a portion of the unshifted pump at the left where the pump laser 5 wavelength is 5145 A and the output signal is shifted down 34 GHz from the frequency of the pump laser 5 and has a linewidth of approximately 20 MHz.

In a Brillouin laser, the reflectivities $R_1$ and $R_2$ of the first and second mirrors 6 and 7 and the length L of the fiber 1 must be selected. These may be selected to maximize the Brillouin output for a given pump input, i.e. to maximize the efficiency. In general, such an optimization is very complicated and can only be carried out with the aid of numerical methods. However, there is one important practical situation in which analytical expressions for the optimum values for $R_1$ and $R_2$ can be derived, namely the case when the power ratio $x$ is equal to or greater than unity, where $x = I_s(O)/I_p(O)$, $I_p(O)$ and $I_s(O)$ being the pump and Brillouin beam intensity respectively at the fiber input end (at objective 2).

The power ratio of $x = 1$ is obtained when the gain in the fiber is $G = (1/FB) - 1$ and for large gains, $x$ tends to the value $1/(1 - FB)$. In a Brillouin laser, the feedback parameter FB is necessarily small. Hence for gains $G > (1/FB) - 1$ the power ratio $x$ is approximately unity. With $x = 1$, the efficiency $\eta = P_o/P$ is given by $$\eta = \frac{R_1(1 - R_1)(1 - R_2) C_o C_i}{1 - FB} \quad (2)$$

where $C_o$ and $C_i$ are the coupling efficiencies at the output and input ends respectively of the fiber 1. The requirement $G > (1/FB) - 1$ places a lower bound on the product of the pump power P and the fiber length L. This restriction is best expressed in terms of a dimensionless quantity $G_e = \gamma LP/F\pi a^2$ which is termed the external gain. It can be shown that for $x = 1$ the external gain must satisfy the condition $$G_e = \frac{(1 - FB)^2}{C_i(1 - R_1) FB} \quad (3)$$

The external gain is a function of $R_1$, $R_2$, $C_o$ and $C_i$ but depends primarily on the magnitude of FB. It is a number in the range 20 to 100.

Once the external gain of the Brillouin oscillator is known, the required fiber length is calculated from $$L = F\pi a^2/\gamma P_1 G_e \quad (4)$$

where
F is the effective intensity factor,
$a$ is the fiber radius, and
$P_1$ is the maximum pump power available from the laser pump source 5.

Note that the theory used to derive the Brillouin power output neglected the fiber loss $\alpha$. Hence the result derived in Eqn. (4) will only be applicable for length $L << 1/\alpha$.

Using standard mathematical procedures, the efficiency given by Eqn. (2) is maximized with respect to $R_1$ and $R_2$ subject to the constraint given by Eqn. (3). The results are $$R_1(opt) = \tfrac{1}{2} + \tfrac{1}{4} R_2 C_o C_i \quad (5)$$

$$R_2(opt) = 4/([4 + C_i G_e] C_o C_i) \quad (6)$$

In the derivation of Eqns. (5) and (6) terms of the order $R_2^2$ or higher are neglected. This approximation is justified by the small optimized values of $R_2$. Note also that the optimum input reflectivity $R_1$ is 50%.

The maximum oscillator efficiency can be found by substituting the optimum values of $R_1$ into Eqn. (2). Neglecting terms of the order $R_2^2$ or higher, we obtain the result $$\eta_{max} = (C_o C_i)/4 [1 - (1 - \tfrac{1}{2} C_o C_i) R_2] \quad (7)$$

To a good approximation, the maximum efficiency of the Brillouin laser is $C_o C_i/4$. Therefore, the Brillouin laser efficiency cannot be greater than 25% for the ring resonator configuration shown in FIG. 1. The reason for this result is that one half of the pump light is lost on coupling into the ring cavity and even though there is 100% conversion of the pump light into Brillouin Stokes light in the ring cavity, one half of this Stokes light is lost back into the pump before it can be coupled out of the ring cavity.

In addition, since the power in the Brillouin shifted Stokes beam is directly related to the pump power, it may be suggested that the power in the Brillouin shifted Stokes beam can increase arbitrarily with increasing pump power. This is not the case, however, since a level will be reached at which the power in the Brillouin Stokes beam is sufficiently high that it will in turn act as a pump and generate another Stokes wave downshifted in frequency from the original pump by 2 $\Delta f$. If the Brillouin shifted Stokes wave entering the second end of the fiber 1 along path 10 is sufficiently high, it will cause a second Stokes wave to be generated in the fiber 1 which will exit from the fiber 1 along path 10 and a portion may be detected at the output of path 11, while the remaining portion of the second Stokes wave will be fed back into the fiber along paths 8 and 4.

Figure 3:
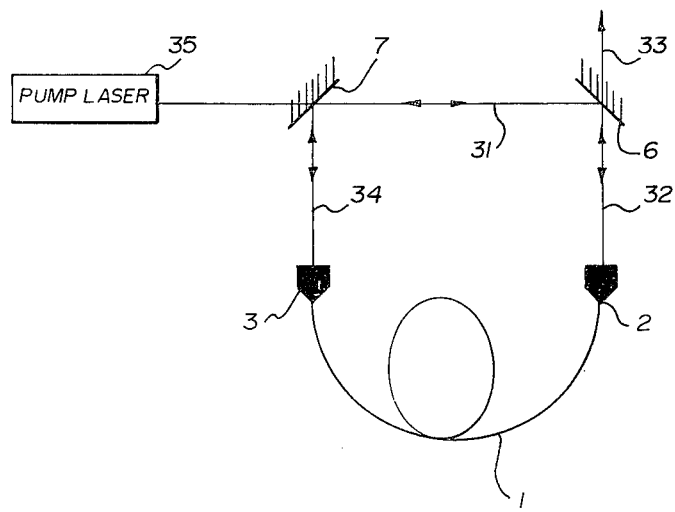
FIG. 3 illustrates a second embodiment of a Brillouin ring laser.

FIG. 3 illustrates a second embodiment of the CW Brillouin ring laser in accordance with the present invention. In this particular embodiment, the ring laser includes a fiber 1 having a first objective 2 at its first end and a second objective 3 at its second end, and a pair of partially reflective mirrors 6 and 7 to complete the ring. However, in this embodiment, the pump laser 35 is positioned so as to direct the pump beam through mirror 7 along a path 31 to mirror 6 where it is reflected along path 32 to the fiber 1 via objective 2. The Brillouin shifted beam generated in the fiber 1 exits from the first end of fiber 1 along path 32 and a portion passes through mirror 6 along path 33 as the Brillouin laser output. The remaining portion is reflected from mirror 6 onto mirror 7 where it is reflected along path 34 into the second end of the fiber 1 via objective 3. In this embodiment, greater pump laser 35 power is required to achieve threshold since the pump beam is directed at the two mirrors 7 and 6, however the output Brillouin shifted beam need pass through only one mirror 6.

Figure 4:
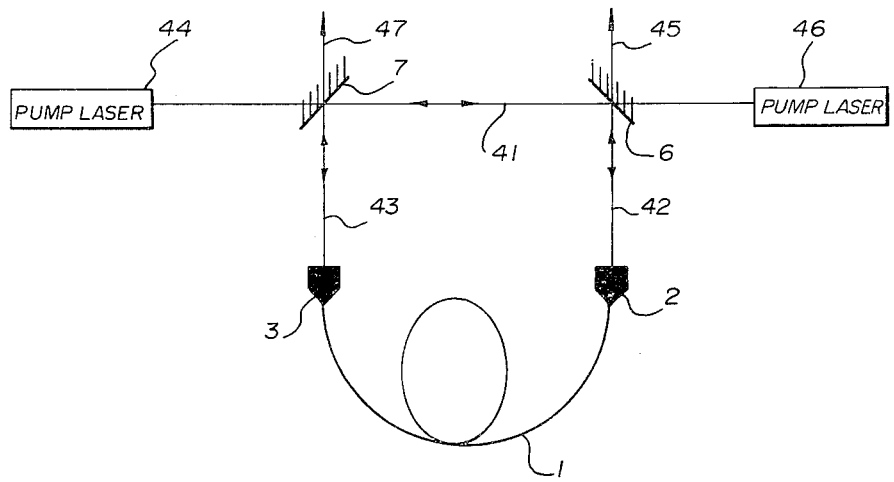
FIG. 4 illustrates a two Brillouin beam ring laser system.

Since the Brillouin lasers described in FIGS. 1 and 3, have a pump beam propagating in one direction around the ring and a Brillouin shifted beam propagating in the opposite direction, two Brillouin lasers may be made to operate in a single fiber 1 as illustrated in FIG. 4. The two Brillouin laser system includes a ring beam path having an optional fiber 1 with a first objective 2 and a second objective 3, and first and second mirrors 6 and 7 which are positioned to provide beam paths 41, 42 and 43 around the ring. A first pump laser 44 provides a pump beam along path 41 to mirror 6 where it is reflected along path 42 into the first end of the fiber 1. As in the laser in FIG. 3, a Brillouin shifted beam is generated in the fiber 1 and exits from the first end along path 42, with a portion passing through mirror 6 as a first Brillouin laser output along path 45. In addition, a second pump laser 46 provides a second pump beam along path 41, however in a direction opposite to that of the first pump beam. The second beam is reflected by mirror 7 along path 43 into the second end of fiber 1. A second Brillouin shifted beam is generated in fiber 1 and exits from the second end along path 43, with a portion passing through mirror 7 as a second Brillouin laser output along path 47.

The pump lasers 44 and 46 illustrated in FIG. 4 are positioned with respect to the ring following the configuration shown in FIG. 3, however they may alternately be positioned as in the embodiment shown in FIG. 1 or with one pump laser as in FIG. 1 and the other pump laser as in FIG. 3, as long as the pump beams are propagating in opposite directions around the ring.

We claim:

1. A cw Brillouin ring laser comprising:
   a length of low loss optical fiber, having a first end and a second end;
   pump laser means for directing a pump beam of optical energy into the first end of the optical fiber for generating a Brillouin shifted Stokes beam therein; and
   first partially reflective mirror means and second partially reflective mirror means, being positioned to form a ring beam path with the first and second ends of the fiber, the first mirror means reflecting a portion of the Brillouin shifted Stokes beam eminating from the first end of the fiber to the second mirror means, and the second mirror means reflecting a portion of the received Brillouin beam into the second end of the fiber.

2. A cw Brillouin ring laser as claimed in claim 1 which further includes first objective means located at the first end of the optical fiber for coupling optical energy into and out of the first end of the optical fiber and second objective means located at the second end of the optical fiber for coupling optical energy into and out of the second end of the optical fiber.

3. A cw Brillouin ring laser as claimed in claim 1 wherein the pump laser means is positioned to direct the pump beam to the first end of the optical fiber through said first mirror means, the portion of the Brillouin shifted Stokes beam passing through the second mirror means providing the laser output.

4. A cw Brillouin ring laser as claimed in claim 1 wherein the pump laser means is positioned to direct the pump beam to the first mirror means through the second mirror means for reflection to the first end of the optical fiber, the portion of the Brillouin shifted Stokes beam passing through the first mirror means providing the laser output.

5. A cw Brillouin ring laser as claimed in claim 1 which further includes second pump laser means for directing a pump beam of optical energy into the second end of the optical fiber for generating a second Brillouin shifted Stokes beam within the fiber, the second Brillouin beam emanating from the second end of the fiber.

* * * * *